UNITED STATES PATENT OFFICE.

A. K. EATON, OF NEW YORK, N. Y.

IMPROVED DEPILATING COMPOUND FOR HIDES.

Specification forming part of Letters Patent No. 17,562, dated June 16, 1857.

*To all whom it may concern:*

Be it known that I, A. K. EATON, of the city, county, and State of New York, have invented a new and useful Depilating Process for the Use of Tanners in the Preparation of Hides and Skins for Tanning, of which the following is a specification.

The depilating composition which I employ in this process consists of the following ingredients, viz: soda-ash, caustic lime, monosulphuret of potassium, hard soap, and soft water.

For depilating a pack of fifty sides of cowhides or one hundred and thirty calf-skins the before-named ingredients are to be used in the following manner and proportions—namely: Take fifteen pounds of soda-ash, thirty pounds of caustic lime. Stir them in ten gallons of soft water and boil the mixture in an iron or other suitable vessel for one hour. Let the solution become cold, and then add one pound of sulphuret of potassium dissolved in water and stir the whole thoroughly. The next thing required is a vat of suitable capacity to receive the pack of hides or skins, with a sufficient quantity of soft water to cover them. Into this vat of water a small quantity of the preparation before described should be poured and the vat well stirred. If the attendant on dipping his finger into the vat and applying it to his tongue does not feel a sensation and taste peculiar to the alkali, more of the solution must be added until the strength of the liquor is sufficient to produce these sensations. Two or three pounds of hard soap dissolved in water may now be added to the liquor and well stirred. The vat is now prepared, and the hides or skins must be placed in it and agitated frequently to expose every part of them thoroughly to contact with the liquor.

In order that the hides or skins may not be too much plumped for the first twenty-four hours, the strength of the liquor up to the end of that period should not be increased; but after that it may be gradually strengthened as the process advances and until it is completed, which will be in from two to four days, according to circumstances, when the hair will come off very readily. By increasing the proportion of the sulphuret of potassium the time required for the process will be correspondingly shortened.

The labor involved in this process is comparatively slight, the stock is in a better condition for being treated with the tanning agents, and is heavier than when treated by the ordinary depilating process, as less gelatine is dissolved, and as the tanning or conversion of the hide into leather is merely combining the tannin of the tanning agent with the gelatine of the hide. The less gelatine is dissolved by the depilatory process the greater will be the product of leather. The leather, when finished, is also closer grained, and less pervious to water when the skin is unhaired by this process than when unhaired by a process that dissolves more of the gelatine, as the texture is less open and spongy.

The skins or hides which are depilated by this process will produce leather which is more flexible, as well as more compact and durable, than those which are depilated by the ordinary processes.

The sulphuret of potassium before mentioned I have prepared as follows, viz: Take equal parts, by measure, of finely-pulverized charcoal and sulphate of potash. Mix them thoroughly and expose them to a dull-red heat for an hour in a covered crucible. The product will be the sulphuret required.

What I claim as my invention, and desire to secure by Letters Patent, is—

The depilating process herein described, consisting in the employment of the ingredients mentioned in the manner set forth.

In testimony whereof I have hereunto subscribed my name.

A. K. EATON.

In presence of—
R. PAINE,
P. J. CASLER.